United States Patent
Nakayama et al.

(10) Patent No.: US 7,861,112 B2
(45) Date of Patent: Dec. 28, 2010

(54) STORAGE APPARATUS AND METHOD FOR CONTROLLING THE SAME

(75) Inventors: Yosuke Nakayama, Odawara (JP); Hiromi Matsushige, Hiratsuka (JP); Hiroshi Suzuki, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 363 days.

(21) Appl. No.: 12/024,206

(22) Filed: Feb. 1, 2008

(65) Prior Publication Data

US 2009/0106584 A1    Apr. 23, 2009

(30) Foreign Application Priority Data

Oct. 23, 2007    (JP)    ............... 2007-275621

(51) Int. Cl.
     *G06F 11/00*    (2006.01)

(52) U.S. Cl. ............................. 714/6; 714/2

(58) Field of Classification Search ............ 714/6, 714/2; 713/1
See application file for complete search history.

(56) References Cited

U.S. PATENT DOCUMENTS

| | | | |
|---|---|---|---|
| 6,189,117 B1 * | 2/2001 | Batchelor et al. | 714/48 |
| 6,314,532 B1 * | 11/2001 | Daudelin et al. | 714/38 |
| 7,346,804 B2 * | 3/2008 | Forrer et al. | 714/5 |
| 7,475,282 B2 * | 1/2009 | Tormasov et al. | 714/6 |
| 7,490,263 B2 * | 2/2009 | King | 714/8 |
| 7,681,089 B2 * | 3/2010 | Ashmore | 714/57 |
| 2003/0084368 A1 * | 5/2003 | Sprunt et al. | 714/5 |
| 2003/0135729 A1 * | 7/2003 | Mason et al. | 713/2 |
| 2006/0107131 A1 * | 5/2006 | Mills et al. | 714/710 |
| 2006/0143501 A1 * | 6/2006 | Tormasov et al. | 714/5 |
| 2006/0143509 A1 * | 6/2006 | Okawa | 714/11 |
| 2006/0218343 A1 * | 9/2006 | Higashijima et al. | 711/114 |
| 2006/0277445 A1 * | 12/2006 | Kano et al. | 714/42 |
| 2007/0271302 A1 * | 11/2007 | Atkins et al. | 707/200 |
| 2008/0162984 A1 * | 7/2008 | Kalra et al. | 714/4 |

FOREIGN PATENT DOCUMENTS

JP    11-191037    7/1999

\* cited by examiner

*Primary Examiner*—Scott T. Baderman
*Assistant Examiner*—Loan L. T. Truong
(74) *Attorney, Agent, or Firm*—Brundidge & Stanger, P.C.

(57) ABSTRACT

Provided is a storage apparatus that can dramatically shorten the time for recovery from a fault in a storage device. In a storage apparatus provided with one or more storage devices and a method for controlling the storage apparatus, when a fault occurs in the storage device, whether or not the fault is a predetermined specific fault is judged, and the storage device is rebooted if the fault is the predetermined specific fault. As a result, recovery from the fault can be achieved in a dramatically shorter amount of time than the time required for replacement of the storage device. Accordingly, the time for recovery from the fault in the storage device can be shortened dramatically.

4 Claims, 7 Drawing Sheets

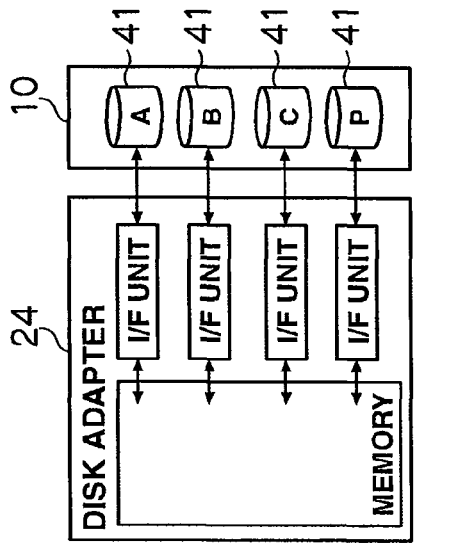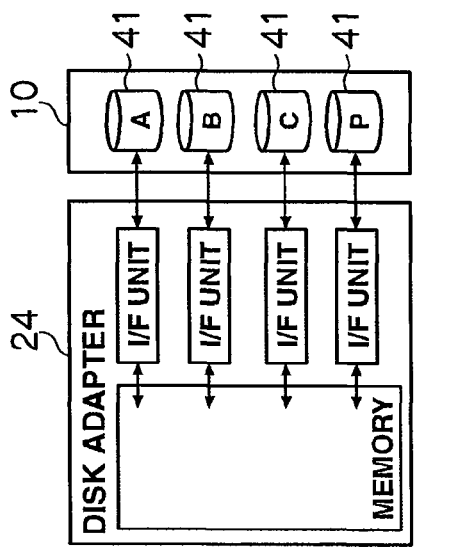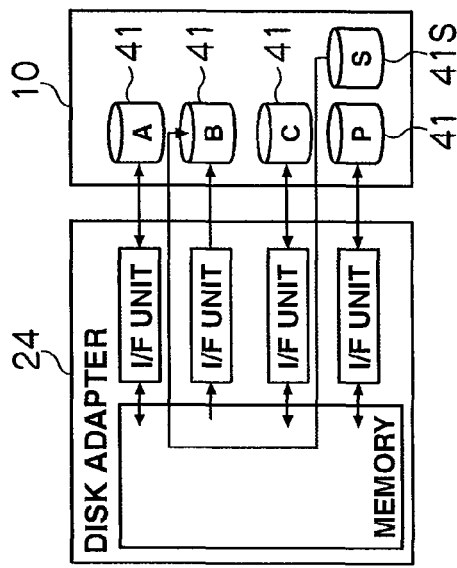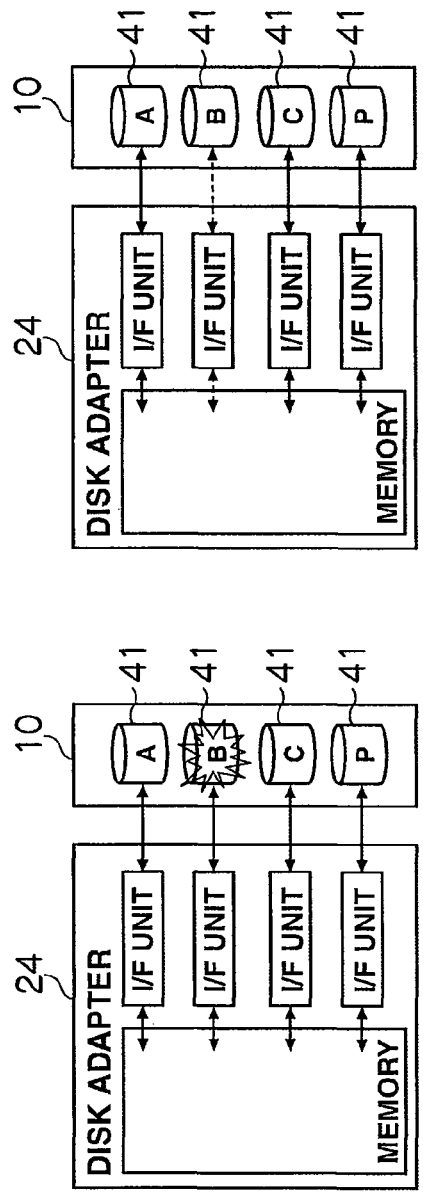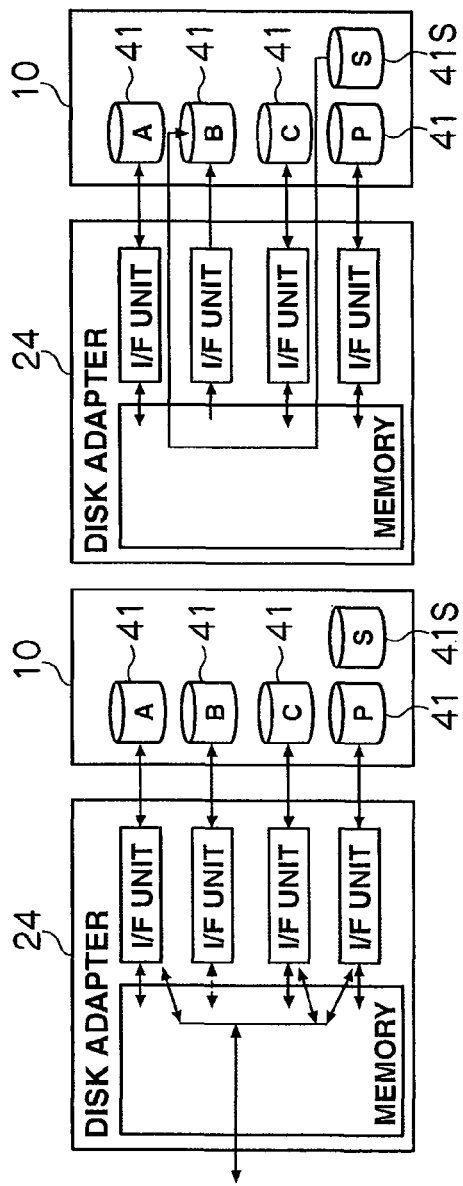

FIG.5

| UNIT ID | 1 | 2 | 3 | ... | n | } 50A |
|---|---|---|---|---|---|---|
| REBOOT FREQUENCY | 0 | 3 | 0 | ... | 0 | } 50B |

| DATE | TIME | LOCATION | KIND | PROCESSING CONTENT |
|---|---|---|---|---|
| 2007/09/13 | 08:38:11 | A | SATA 100G | Drive-PWR OFF |
| 2007/09/13 | 08:38:26 | A | SATA 100G | Drive-PWR ON |
| 2007/09/13 | 19:57:09 | B | SATA 250G | Drive-PWR OFF |
| 2007/09/13 | 19:57:20 | B | SATA 250G | Drive-PWR ON |
| 2007/09/14 | 11:06:19 | C | SATA 150G | Drive-PWR OFF |
| 2007/09/14 | 11:06:32 | C | SATA 150G | Drive-PWR ON |
| 2007/09/15 | 14:36:04 | A | SATA 500G | Drive-PWR OFF |
| 51A | 51B | 51C | 51D | 51E |

51

STORAGE APPARATUS AND METHOD FOR CONTROLLING THE SAME

CROSS-REFERENCES TO RELATED APPLICATIONS

This application relates to and claims priority from Japanese Patent Application No. 2007-275621, filed on Oct. 23, 2007, the entire disclosure of which is incorporated herein by reference.

BACKGROUND

1. Field of the Invention

The invention relates generally to a storage apparatus and a method for controlling the storage apparatus, and is suitable for use in, for example, a storage apparatus in which SATA (Serial AT Attachment) disk drives are used as storage devices.

2. Description of Related Art

In recent years, the demand for increased capacity and reduced cost in storage apparatuses has been increasing. In this situation, many kinds of storage apparatuses, each of which is provided with an inexpensive and large-capacity SATA disk drive as a storage device, have been coming out recently.

But an SATA disk drive has a problem of being low in reliability and being likely to cause data loss, compared with an FC (Fibre Channel) disk drive. However, the problem can be considered as being handled to some extent by using the techniques such as correction read and correction copy disclosed in, e.g., JP11-191037 A.

Incidentally, the number of SATA disk drives provided in one storage apparatus has recently continued to increase, and accordingly, the frequency of replacement of SATA disk drives in which a fault has occurred has been increasing.

However, when a storage apparatus is provided with SATA disk drives or SAS disk drives as storage devices, a problem arises in that much time is required for the work of replacing an SATA disk drive or SAS disk drive in which a fault has occurred, because the SATA disk drive or SAS disk drive has a low data transfer speed and a large capacity.

In the case of a 750 Gbyte product, for example, 40 hours are required for the so-called collection copy, in which the data in the faulty SATA or SAS disk drive is restored in a spare disk drive by using parity data, and 40 hours are required also for the so-called copy-back, in which the data stored in the spare disk drive is copied to a new post-replacement SATA or SAS disk drive. Therefore, for replacing one SATA disk drive, 80 hours are required in total.

Also, during the above time, a fault is not allowed to occur in other disk drives that constitute an ECC (Error Correction Code) group together with the faulty SATA or SAS disk drive. For example, when a fault occurs in another SATA disk drive in the ECC group during recovery work, the problem of occurrence of a double fault, which leads to an irreparable state may arise. Note that the ECC group indicates a group composed of disk drives that store, when dividing data to be stored in the disk drives by utilizing RAID (Redundant Array of Inexpensive Disks), the divided data, the parity data calculated based on the divided data, or both data.

Moreover, during the above-described collection copy or copy-back, the load resulting from the fault is place on the other disk drives and spare disk drive that constitute the ECC group together with the faulty SATA or SAS disk drive and paths. Therefore, response performance to access may be reduced.

SUMMARY

The present invention has been made in light of the above, and an object of the invention is to provide a storage apparatus that can dramatically shorten the time for recovery from a fault in a storage device and a method for controlling the storage apparatus.

In order to attain the above object, according to the invention, provided is a storage apparatus provided with one or more storage devices, including: a control unit for controlling read/write of data to the storage device, characterized in that the control unit judges, when a fault occurs in the storage device, whether or not the fault is a predetermined specific fault; and reboots the storage device if the fault is a predetermined specific fault.

Also, according to the present invention, provided is a method for controlling a storage apparatus provided with one or more storage devices, including: a first step of, when a fault occurs in the storage device, judging whether or not the fault is a predetermined specific fault; and a second step of, if the fault is a predetermined specific fault, rebooting the storage device.

A storage device may recover from a fault via the reboot. In this case, the recovery from the fault can be achieved in a dramatically shorter amount of time than the time required for replacement of the storage device.

According to the invention, the time for recovery from a fault in a storage device can be shortened dramatically.

Other aspects and advantages of the invention will be apparent from the following description and the appended claims.

BRIEF DESCRIPTION OF THE DRAWINGS

FIGS. 4A to 4E are conceptual diagrams briefly explaining hard disk drive reboot processing according to an embodiment of the invention.

FIG. 5 is a chart explaining a reboot frequency management table.

FIG. 6 is a chart explaining a reboot detailed information management table.

DETAILED DESCRIPTION OF PREFERRED EMBODIMENTS

An embodiment of the invention will be described in detail with reference to the accompanying drawings.

(1) Configuration for Storage System according to Embodiment

Figure 1:
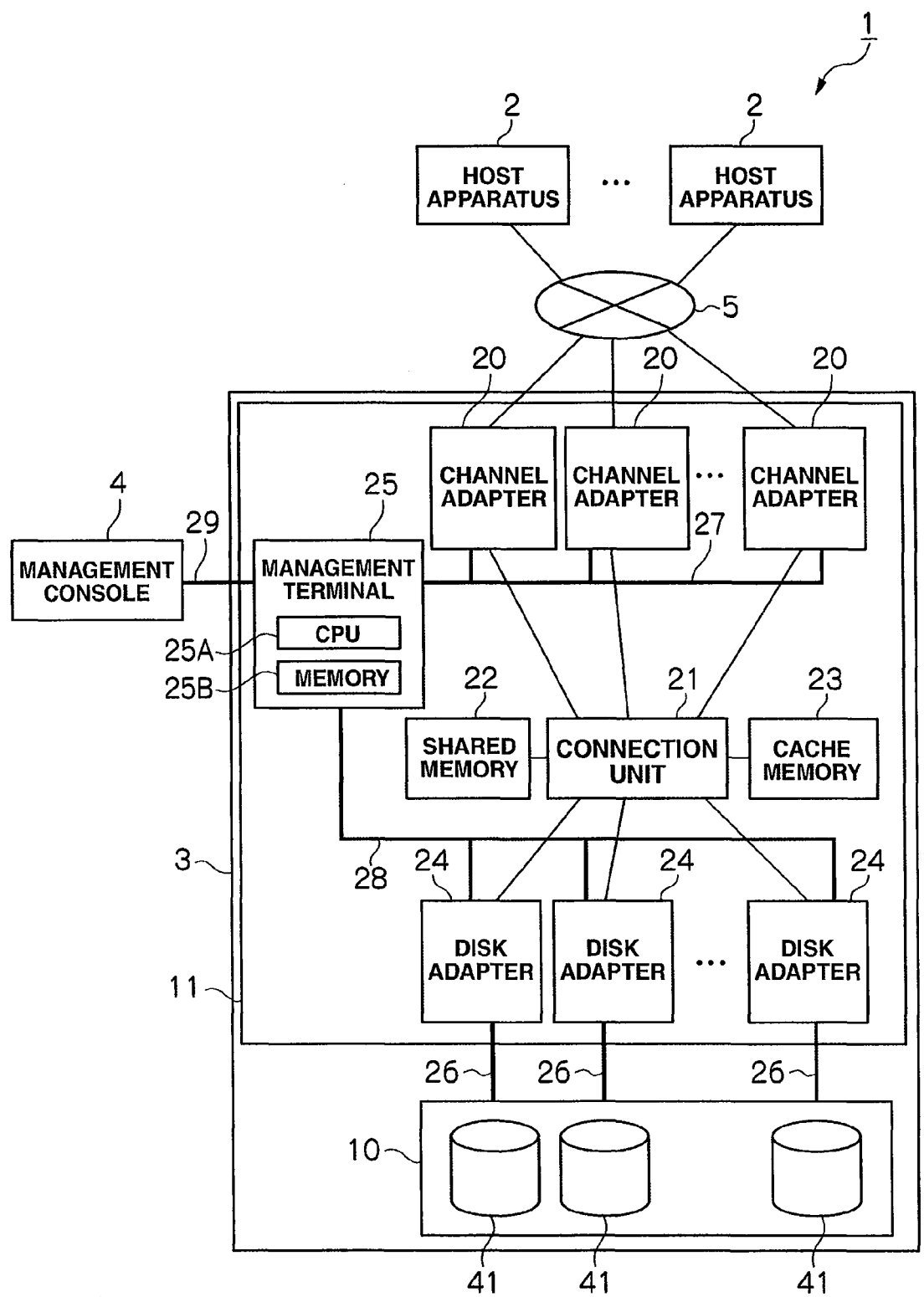
FIG. 1 is a block diagram showing an overall configuration for a storage system according to an embodiment of the invention.

FIG. 1 shows a storage system 1 according to an embodiment of the invention. The storage system 1 is composed of plural host apparatuses 2, a storage apparatus 3, and a management console 4.

Each of the host apparatuses 2 is a computer apparatus provided with information processing resources such as a CPU (Central Processing Unit) and memory, and is composed of, e.g., a personal computer, work station, or mainframe. The host apparatus 2 is equipped with information input devices (not shown in the drawing) such as a keyboard, switch, pointing device, and microphone and information output devices (not shown in the drawing) such as a monitor display and speaker.

The host apparatus 2 is connected to the storage apparatus 3 via a network 5 composed of, e.g., a SAN, a LAN, the Internet, a public line, or a dedicated line. For example, in the case of the network 5 being a SAN, communication between the host apparatus 2 and the storage apparatus 3 via the network 5 is implemented in accordance with Fibre Channel Protocol. In the case of the network 5 being a LAN, communication is implemented in accordance with TCP/IP (Transmission Control Protocol/Internet Protocol).

The storage apparatus 3 is composed of a disk unit part 10 and a control unit 11 for controlling the disk unit part 10.

Figure 2:
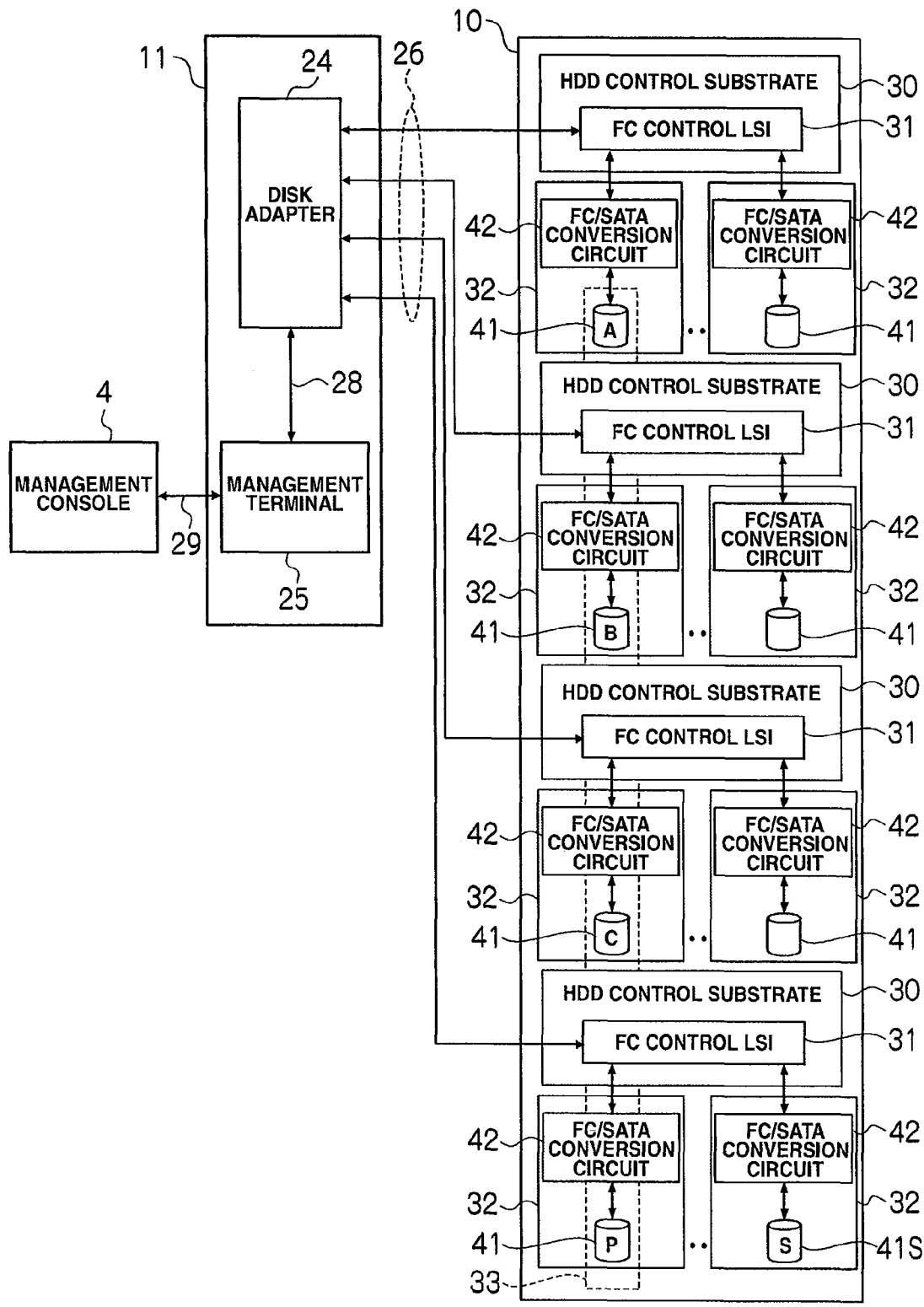
FIG. 2 is a block diagram explaining a disk unit part.

The disk unit part 10 is provided with plural hard disk drive control substrates 30 respectively connected to corresponding disk adapters 24 in the control unit 11, which will be described later, via corresponding fibre channel cables 26, as shown in FIG. 2. Each of the hard disk drive control substrates 30 is provided with a fibre channel control LSI (Large Scale IC (Integrated Circuit)) 31, and the fibre channel control LSI 31 realizes the communication between the hard disk drive control substrate 30 and the disk adapter 24 in accordance with Fibre Channel Protocol.

Figure 3:
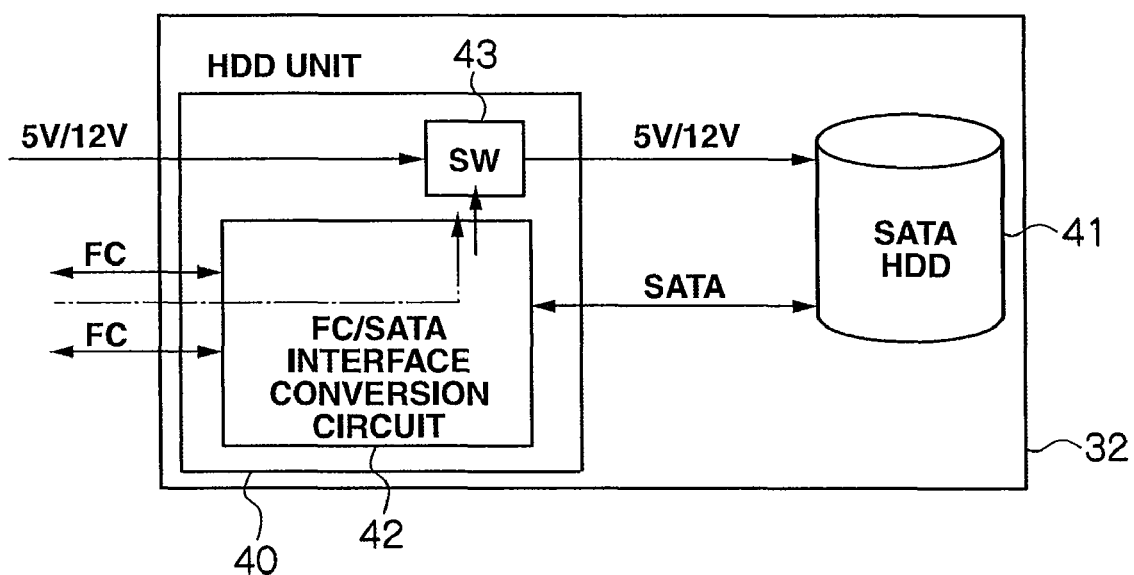
FIG. 3 is a block diagram explaining a hard disk drive unit.

Plural hard disk drive units 32 are connected to each hard disk drive control substrate 30. Each of the hard disk drive units 32 is configured to house, in its casing, a control substrate 40 and an SATA disk drive 41, as shown in FIG. 3. The control substrate 40 is provided with an FC/SATA interface conversion circuit 42 and a switch 43.

The FC/SATA interface conversion circuit 42 has a function for converting a fibre channel standard command given from the disk adapter 24 via the corresponding hard disk drive control substrate 30 (FIG. 2) into an SATA standard command, and converting an SATA standard command given from the SATA disk drive 41 into a fibre channel standard command.

The switch 43 is composed of an FET (Field Effect Transistor), a relay, or similar. Power supply voltage of 5 V/12 V given from the hard disk drive control substrate 30 to the hard disk drive unit 32 are supplied to the SATA disk drive 41 via the switch 43. The switch 43 can be turned on/off according to an instruction from the hard disk drive control substrate 30 to which the hard disk drive unit 32 is connected. This enables supplying power supply voltages to the SATA disk drive 41 and stopping of supplying the power supply voltages.

The SATA disk drive 41 in each hard disk drive unit 32 is operated by the disk adapter 24 in a RAID system. Specifically, as shown in FIG. 2, the SATA disk drives 41 separately connected to the hard disk drive control substrates 30 constitute an ECC group 33, and data from the host apparatus 2 is distributed to be stored in the SATA disk drives 41 belonging to the ECC group 33. Parity data is also created based on the distributed pieces of data, and the parity data is stored in the SATA disk drives 41 in the relevant ECC group 33.

Meanwhile, the control unit 11 is constituted to include plural channel adapters 20, a connection unit 21, shared memory 22, cache memory 23, the plural disk adapters 24, and a management terminal 25.

Each of the channel adapters 20 is constituted as a microcomputer system provided with a microprocessor, memory, communication interface, etc., and is provided with a port for being connected to the network, 5. The channel adapter 20 interprets various commands sent from the host apparatus 2 via the network 5 to execute the commands. The port of the channel adapter 20 is assigned a network address (e.g., IP address or WWN) for identification, and thus, each channel adapter 20 can individually function as NAS (Network Attached Storage).

The connection unit 21 is connected to the channel adapters 20, the shared memory 22, the cache memory 23, and the disk adapters 24. Transfer of data and commands between the channel adapters 20, the shared memory 22, the cache memory 23, and the disk adapters 24 is performed via the connection unit 21. The connection unit 21 is composed of, e.g., a switch such as an ultrahigh-speed cross bus switch for conducting data transfer via high-speed switching, or a bus.

The shared memory 22 and the cache memory 23 each are storage memory shared by the channel adapters 20 and the disk adapters 24. The shared memory 22 is used to mainly store various kinds of control information such as system configuration information about the overall configuration for the storage apparatus 3, commands, etc. The cache memory 23 is mainly used to temporarily store the data to be input/output to/from the storage apparatus 3.

Each disk adapter 24 is configured as a microcomputer system equipped with a micro processor, memory, etc., and functions as an interface for performing protocol control during communication with each hard disk drive unit 32 in the disk unit part 10. The disk adapter 24 controls the corresponding hard disk drive unit 32 in response to a read/write request from the host apparatus 2, and reads/writes the requested data from/to the SATA disk drive 41 in the hard disk drive unit 32.

The management terminal 25 is a user interface equipped with information processing resources such as a CPU 25A and memory 25B, and is composed of, e.g., a notebook-type personal computer. The management terminal 25 is connected to the channel adapters 20 via a LAN 27, and is connected to the disk adapters 24 via a LAN 28. An operator can define system configuration information using the management terminal 25, and can store the defined system configuration information in the shared memory 22 via the channel adapter 20 or the disk adapter 24 and the connection unit 21.

The management console 4 is composed of, e.g., a personal computer, work station, or a computer such as a portable information terminal, and is connected to the management terminal 25 in the storage apparatus 3 via a LAN 29. The management console 4 is provided with display devices such as a GUI (Graphical User Interface) for performing various setting for the storage apparatus 3 and various information, input devices such as a keyboard and a mouse for an operator to conduct various operations and various setting inputs, and a communication device for communicating with the management terminal 25 in the storage apparatus 3 via the LAN 29. The management console 4 executes various kinds of processing in accordance with various orders input via the input devices. For example, the management console 4 displays, on the display device, various kinds of information such as fault information from the management terminal 25 in the storage apparatus 3, or sends various settings input using the GUI displayed on the display device to the management terminal 25 in the storage apparatus 3.

(2) Hard Disk Drive Reboot Function

Next, the hard disk drive reboot function provided in the storage apparatus 3 will be explained.

In the storage apparatus 3, when any fault occurs in the hard disk drive unit 32 connected to each hard disk drive control substrate 30 (FIG. 2) in the disk unit part 10, the hard disk drive control substrate 30 sends fault information in accordance with the fault content to the relevant disk adapter 24. Examples of the above faults include a command-timeout, link fault, media error, and power fault.

A command-timeout is a fault in which, after a command is sent from the hard disk drive control substrate 30 to the hard disk drive unit 32, no response is received within a given period, and a link fault is a fault in which the hard disk drive control substrate 30 cannot recognize the hard disk drive unit 32 supposedly connected thereto. Also, a media error is a fault in which read/write of the required data fails to be conducted, and a power fault is a fault that occurs in a power supply system.

Regarding a media error, power fault, etc., there is little possibility that the SATA disk drive 41 will recover from the fault, even after being rebooted (restarted). Meanwhile, regarding a command-timeout, link fault, etc., a problem of an internal controller in the SATA disk drive 41 may be the cause. In such a case, there is a possibility that the SATA disk drive 41 can recover from the fault if rebooted.

Based on the above, the storage apparatus 3 is equipped with the hard disk drive reboot function for, when a predetermined fault, such as a command-timeout or link fault, that can be recovered via reboot (hereinafter referred to as specific fault), occurs, rebooting the SATA disk drive 41 to attempt recovery of the SATA disk drive 41.

More specifically, when a fault occurs in one of the SATA disk drives 41 as shown in FIG. 4A (the SATA disk drive 41 "B" in FIG. 4A), the storage apparatus 3 blocks the SATA disk drive (hereinafter, referred to as faulty SATA disk drive), as shown in FIG. 4B. The storage apparatus 3 then reboots the faulty SATA disk drive 41, as shown in FIG. 4C.

At this point, the storage apparatus 3 sets a collection mode as an operation mode employed when a read/write request is given from the host apparatus 2 with respect to the ECC group 33 (FIG. 2) that the faulty SATA disk drive 41 belongs to.

If the collection mode is set as the operation mode, when receiving a read request for the written data in the faulty SATA disk drive 41 from the host apparatus 2, the storage apparatus 3 reads the required data (divided data and parity data) from the other SATA disk drive 41 constituting the ECC group 33, as shown in FIG. 4C, restores the data stored in the faulty SATA disk drive 41 based on the read data, and sends the restored data to the host apparatus 2.

Also, where the collection mode is set as the operation mode, when receiving a write request for the data in the faulty SATA disk drive 41 from the host apparatus 2, the storage apparatus 3 holds the data to be written to the faulty SATA disk drive 41 (hereinafter referred to as update data) in a spare SATA disk drive (hereinafter referred to as spare disk drive) 41S.

Then, when the faulty SATA disk drive 41 recovers from the fault via the above reboot, the storage apparatus 3 copies the update data held in the spare disk drive 41S to the corresponding address position in the SATA disk drive 41 that has recovered from the fault, as shown in FIG. 4D. The storage apparatus 3 then returns to normal operation, as shown in FIG. 4E.

Meanwhile, the storage apparatus 3 in this embodiment manages the reboot frequency and other reboot information for each SATA disk drive 41, besides the above reboot of the SATA disk drive 41 in which a specific fault has occurred. Then, the storage apparatus 3 notifies, e.g, when the reboot frequency is at or above a predetermined threshold value in any of the SATA disk drives 41, the management console 4 of that fact, and also during, e.g., maintenance, the storage apparatus 3 displays reboot information on the management terminal 25 in response to a request from, e.g., a system administrator.

In order to carry out the above, the shared memory 22 (FIG. 1) in the storage apparatus 3 stores a reboot frequency management table 50, shown in FIG. 5, and a reboot detailed information management table 51, shown in FIG. 6.

As is apparent from FIG. 5, the reboot frequency management table 50 is composed of a "unit ID" column 50A and a "reboot frequency" column 50B. The "unit ID" column 50A stores an identification number given to each hard disk drive unit 32 (SATA disk drive 41) provided in the storage apparatus 3, and the "reboot frequency" column 50B stores the reboot frequency for the SATA disk drive 41 in the hard disk drive unit 32 given the corresponding identification number.

Therefore, FIG. 5, serving as an example, shows that reboot has been conducted "3" times up to now for the SATA disk drive 41 in the hard disk drive unit 32 with the identification number "2."

Also, as is apparent from FIG. 6, the reboot detailed information management table 51 is composed of a "date" column 51A, a "time" column 51B, a "location" column 51C, a "kind" column 51D, and a "processing content" column 51E. The "date" column 51A and the "time" column 51B respectively store the data and time when the processing shown in the "processing content" column 51E was executed. The "location" column 51C stores an identification number given to the hard disk drive control substrate 30 connected to the hard disk drive unit 32 in which the processing shown in the "processing content" column 51E was executed.

The "kind" column 51D stores information indicating the kind and capacity of the hard disk drive in the hard disk drive unit 32, and the "processing content" column 51E stores the content of the processing executed on the hard disk drive 41.

Therefore, FIG. 6, serving as an example, shows that a hard disk drive (SATA disk drive 41), with a capacity of 100 Gbyte and of the kind "SATA," and connected to the hard disk drive control substrate 30 with the identification number "A" in the storage apparatus 3, was subjected to "power-off (Drive-PWR OFF)" at "08:38:11" on "Sep. 13, 2007"; and then, the hard disk drive was subjected to "power-on (Drive-PWR ON)" at "08:38:26" on the same date.

Each disk adapter 24 in the storage apparatus 3 executes various kinds of processing concerning the above-described hard disk drive reboot function based on various fault information sent from the hard disk drive control substrate 30, to which the disk adapter 24 is connected, via the fibre channel cable 26, and the reboot frequency management table 50 (FIG. 5) and the reboot detailed information management table 51 (FIG. 6) stored in the shared memory 22.

Figure 7:
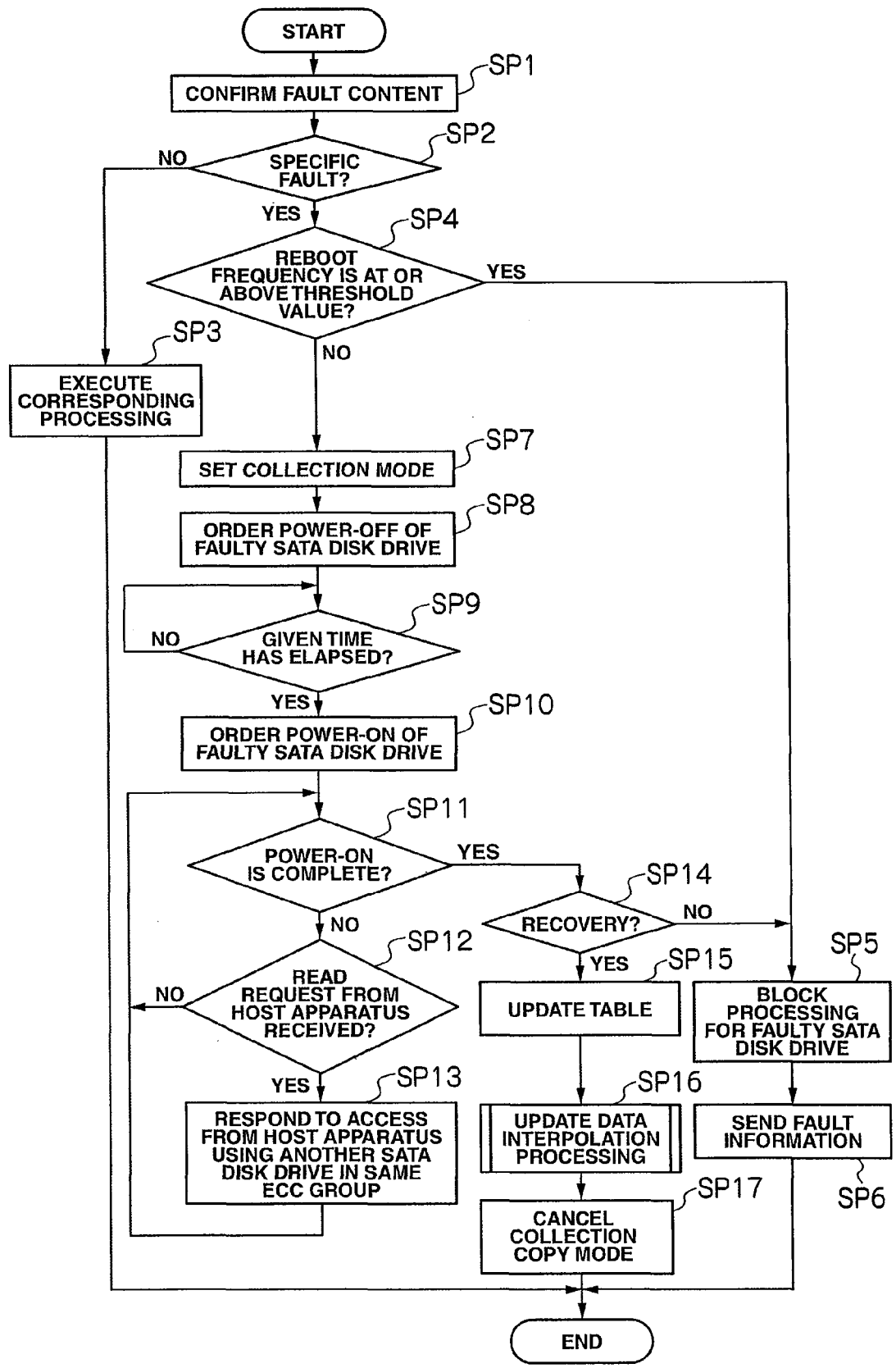
FIG. 7 is a flowchart showing a procedure for hard disk drive reboot processing.

FIG. 7 shows the specific content of the processing concerning the hard disk drive reboot function executed by the disk adapter 24. The disk adapter 24 executes the hard disk drive reboot processing shown in FIG. 7 in accordance with the corresponding control program stored in the memory provided in the disk adapter 24.

More specifically, when receiving error notification, from the hard disk drive control substrate 30 (FIG. 2), to which the disk adapter 24 is connected via the fibre channel cable 26 (FIG. 2), that a fault has occurred in any of the SATA disk drives 41, the disk adapter 24 starts hard disk drive reboot processing, and first confirms the content of the fault that has occurred based on the error notification (SP1).

The disk adapter 24 judges whether or not the fault is a specific fault based on the confirmation result at step SP1

(SP2). When the disk adapter 24 obtains a negative result, it executes predetermined processing in accordance with the fault content (SP3), and then terminates this hard disk drive reboot processing.

Note that the specific fault here means, e.g., a fault due to the detection of a timeout or link fault. A non-specific fault means an irreparable fault such as a media fault or a fault in the hardware itself. The above faults are judged by a program based on an identifier showing the fault kind, the information showing the fault location, etc., that are included in the information about error notification.

Meanwhile, when the disk adapter 24 obtains a positive result for the judgment at step SP2, it refers to the reboot frequency management table 50 (FIG. 5) stored in the shared memory 22 (FIG. 1), and judges whether or not the current reboot frequency for the faulty SATA disk drive 41 in which the relevant fault has occurred is at or above a predetermined threshold value (SP4).

When the disk adapter 24 obtains a positive result for this judgment, it blocks the faulty SATA disk drive 41 (SP5), and sends fault information including the information about, e.g., the content of the fault that has occurred in the faulty SATA disk drive 41 and the identification number of the SATA disk drive 41 to the management terminal 25 (FIG. 1) (SP6). The disk adapter 24 then terminates this hard disk drive reboot processing. As a result, the fault information is displayed on the management terminal 25, and also is sent to the management console 4 via the management terminal 25. Consequently, the faulty SATA disk drive 41 is replaced by a system administrator.

Meanwhile, when the disk adapter 24 obtains a negative result for the judgment at step SP4, it sets the collection mode described with reference to FIGS. 4C and 4D as the operation mode for a read/write request from the host apparatus 2 with respect to the ECC group 33 (FIG. 2) the faulty SATA disk drive 41 belongs to (SP7).

Subsequently, the disk adapter 24 instructs the corresponding hard disk drive control substrate 30 in the disk unit part 10 to stop supplying power supply voltages to the faulty SATA disk drive 41 (SP8), and then waits until a given time passes (SP9).

After the given time has passed, the disk adapter 24 instructs the hard disk drive control substrate 30 to restart supplying power supply voltages to the faulty SATA disk drive 41 (SP10).

The disk adapter 24 judges whether or not start processing for the faulty SATA disk drive 41 has been completed (SP11). When the disk adapter 24 obtains a negative result, it judges whether or not there has been a read request from the host apparatus 2 with respect to the ECC group 33 that the faulty SATA disk drive 41 belongs to (SP12).

When the disk adapter 24 obtains a negative result for the judgment, it returns to step SP11. Meanwhile, when the disk adapter 24 obtains a positive result, it executes read processing during the collection mode described with reference to FIG. 4C (SP13), and returns to step SP11. The disk adapter 24 then repeats the processing covering from step SP11-step SP13.

Eventually, when the disk adapter 24 obtains a positive result at step SP11 after the completion of start processing for the faulty SATA disk drive 41, it judges whether or not the faulty SATA disk drive 41 has recovered form the fault (SP14). More specifically, the disk adapter 24 determines that the faulty SATA disk drive 41 has recovered from the fault when it accesses the faulty SATA disk drive 41 and obtains a normal response.

When the disk adapter 24 obtains a negative result for this judgment, it advances to step SP5. Meanwhile, when the disk adapter 24 obtains a positive result, it increments the reboot frequency for the faulty SATA disk drive 41 in the reboot frequency management table 50 stored in the shared memory 22 by one. At this point, the disk adapter 24 also registers necessary information about the stopping and restarting of supplying power supply voltages to the faulty SATA disk drive 41 and in the reboot detailed information management table 51 (SP15).

Next, the disk adapter 24 executes update data interpolation processing in which the update data held in the spare disk drive 41S is copied to the SATA disk drive 41 that has recovered from the fault (SP16), and then cancels the collection mode set for the ECC group 33 that the SATA disk drive 41, which has recovered from the fault as described above, belongs to (SP17). The disk adapter 24 then terminates this hard disk drive reboot processing.

Figure 8:
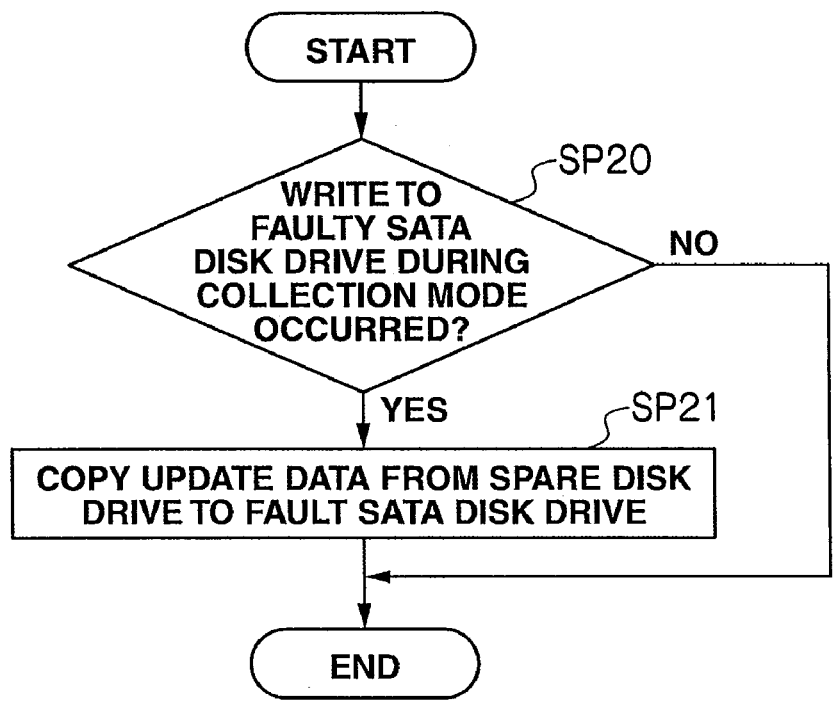
FIG. 8 is a flowchart showing a procedure for update data interpolation processing.

Note that FIG. 8 shows the specific content of the update data interpolation processing executed at step SP16 in the above-described hard disk drive reboot processing.

When the disk adapter 24 advances to step SP16 in the hard disk drive reboot processing, it starts update data interpolation processing, as shown in FIG. 8. First, the disk adapter 24 judges whether or not data now has been written to the faulty SATA disk drive 41 from the host apparatus 2 since the collection mode was set at step SP7 in the hard disk drive reboot processing (SP20).

When the disk adapter 24 obtains a negative result for this judgment, it terminates this update data interpolation processing, and advances to step SP17 in the hard disk drive reboot processing. Meanwhile, when the disk adapter 24 obtains a positive result for this judgment, it copies the update data held in the spare disk drive 41S to the corresponding position in the faulty SATA disk drive 41 by controlling the spare disk drive 41S and the faulty SATA disk drive 41 (SP21). The disk adapter 24 then terminates this update data interpolation processing, and advances to step SP17 in the hard disk drive reboot processing.

Figure 9:
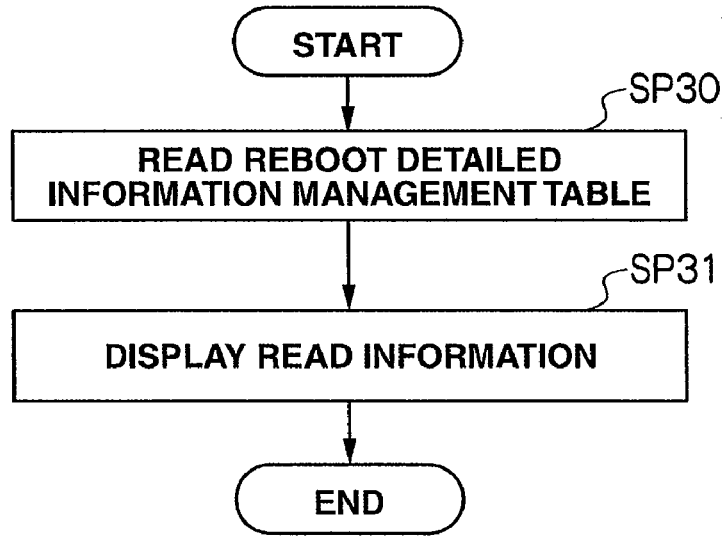
FIG. 9 is a flowchart showing a procedure for reboot detailed information display processing.

FIG. 9 is a flowchart showing the specific content of the processing, which is executed by the CPU 25A in the management terminal 25, when displaying the reboot information in response to a request from a system administrator or similar on the management terminal 25. The CPU 25A executes the reboot detailed information display processing shown in FIG. 9 in accordance with the corresponding control program stored in the memory 25B.

Specifically, when being input with an order to the effect that the reboot information should be displayed via the operation of the management terminal 25 by the system administrator or similar, the CPU 25A starts the reboot detailed information display processing. The CPU 25A first accesses the shared memory 22 via either the channel adapter 20 or the disk adapter 24, and reads the information in the reboot detailed information management table 51 (SP30).

The CPU 25A then displays the read information in the reboot detailed information management table 51 on its own display in a predetermined screen format (SP31), and terminates this reboot detailed information display processing.

(3) Effects of Embodiment

As described above, in the storage apparatus 3 according to the embodiment, when a specific fault occurs in the SATA disk drive 41 provided in the disk unit part 10, the SATA disk drive 41 is rebooted to attempt recovery from the fault.

When the SATA disk drive 41 recovers from the fault via the reboot, the time required for the processing is only about 10 seconds. Therefore, the time required for recovery from a fault can be dramatically shortened compared with the time required for, e.g., replacement of the SATA disk drive 41. The SATA disk drive 41 may not recover from a fault via reboot, but the average recovery time for the fault in the SATA disk drive 41 can be shortened certainly and dramatically.

In other words, what kind of fault occurred and in which SATA disk drive 41 the fault occurred are detected, only the fault-detected SATA disk drive 41 is rebooted, and the data necessary for the fault-detected part is subjected to copy-back processing. Accordingly, the time and work for recovery can be reduced by the processing according to the embodiment, compared with the case where recovery processing is conducted on all the SATA disk drives 41.

Also, the time for recovery from a fault is short in the storage apparatus 3 according to this embodiment. Therefore, this can dramatically reduce the risk of a double fault in which a fault occurs also in another SATA disk drive 41 in the ECC group 33 during recovery work, leading to an irreparable state Moreover, in the storage apparatus 3 according to this embodiment, replacement of the SATA disk drive 41 can be avoided as much as possible. Therefore, a reduction in response performance to access from the host apparatus 2 due to the replacement of the SATA disk drive 41 can be prevented effectively.

(4) Other Embodiments

The above embodiment has been described for the case where the SATA disk drives 41 are employed for all the storage devices provided in the storage apparatus 3, but the invention is not limited to this case. Disk drives other than the SATA disk drives 41, such as FC disk drives or SAS (Serial Attached SCSI (Small Computer System Interface)) disks may be employed as some of the storage devices. Also, the invention can be utilized in the case where non-hard disk drives, such as semiconductor memory or optical disk drives, may be employed as the storage devices.

The above embodiment has also been described for the case where the disk adapter 24 is provided with a function for controlling read/write of data to the SATA disk drive 41 and a function for judging, when a fault occurs in the SATA disk drive 41, whether or not the fault is a predetermined specific fault, and rebooting the SATA disk drive 41 when the fault is a predetermined specific fault. However, the invention is not limited to this case. For example, the latter function may be provided in the management terminal 25 or similar.

Moreover, the embodiment has been described for the case where the disk adapter 24 instructs the hard disk drive control substrate 30 to stop and restart supplying power supply voltages to the faulty SATA disk drive 41, but the invention is not limited to this case. For example, the disk adapter 24 may instruct the hard disk drive control substrate 30 to only conduct reboot so that the hard disk drive control substrate 30 stops and restarts supplying power supply voltages to the faulty SATA disk drive 41 in accordance with that instruction.

Storage apparatuses with a wide variety of configurations can be utilized in the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A storage apparatus provided with one or more storage devices, comprising:
  a control unit for controlling read/write of data to the storage device,
  wherein the control unit judges, when a fault occurs in the storage device, whether or not the fault is a predetermined specific fault; and reboots the storage device if the fault is the predetermined specific fault,
  wherein the control unit distributes and stores data given from a host apparatus in plural storage devices constituting a group, together with parity data created based on the data; and
  wherein, when receiving a read request for the data stored in the storage device during reboot of the storage device, the control unit responds to the read request using the data and the parity data stored in the other storage devices in the group.

2. A storage apparatus provided with one or more storage devices, comprising:
  a control unit for controlling read/write of data to the storage device,
  wherein the control unit judges, when a fault occurs in the storage device, whether or not the fault is a predetermined specific fault; and reboots the storage device if the fault is the predetermined specific fault,
  wherein, when receiving a write request for the data in the storage device during reboot of the storage device, the control unit stores data to be stored in the storage device in a spare storage device in the storage devices; and
  wherein, when the storage device recovers from a fault via the reboot, the control unit copies the data stored in the spare storage device in the storage device that has recovered from the fault.

3. A method for controlling a storage apparatus provided with one or more storage devices, comprising:
  a first step of, when a fault occurs in the storage device, judging whether or not the fault is a predetermined specific fault; and
  a second step of, if the fault is the predetermined specific fault, rebooting the storage device,
  wherein the storage apparatus distributes and stores data given from a host apparatus in plural storage devices constituting a group, together with parity data created based on the data; and
  in the second step, when receiving a read request for the data stored in the storage device during reboot of the storage device, the read request is given a response using the data and the parity data stored in the other storage devices in the group.

4. A method for controlling a storage apparatus provided with one or more storage devices, comprising:
  a first step of, when a fault occurs in the storage device, judging whether or not the fault is a predetermined specific fault; and
  a second step of, if the fault is the predetermined specific fault, rebooting the storage device,
  wherein, in the second step, when receiving a write request for the data in the storage device during reboot of the storage device, data to be stored in the storage device is stored in a spare storage device in the storage devices; and when the storage device recovers from a fault via the reboot, the data stored in the spare storage device is copied to the storage device that has recovered from the fault.

* * * * *